United States Patent [19]
Watkins et al.

[11] Patent Number: 4,611,724
[45] Date of Patent: Sep. 16, 1986

[54] FLUID-STORAGE TANK

[75] Inventors: Robert L. Watkins, Blue Hill, Me.; Kenneth R. Peters, Chelmsford, Mass.

[73] Assignee: JBF Scientific Company, Inc., Southwest Harbor, Me.

[21] Appl. No.: 766,259

[22] Filed: Aug. 16, 1985

[51] Int. Cl.$^4$ ............................................. B65D 7/02
[52] U.S. Cl. ................................... 220/5 A; 220/1 V; 220/22
[58] Field of Search ............... 220/1 V, 1 B, 5 A, 22

[56] References Cited

U.S. PATENT DOCUMENTS

| | | | |
|---|---|---|---|
| 3,131,949 | 5/1964 | Black | 220/5 A |
| 3,310,070 | 3/1967 | Black | 220/5 A |
| 4,483,454 | 11/1984 | Rogers et al. | 220/22 |

Primary Examiner—George T. Hall
Attorney, Agent, or Firm—Cesari and McKenna

[57] ABSTRACT

A tank truck (10) for carrying fuel has a tank (12) whose shell (18) is supported by a baffle (20). The vertical cross section of the baffle is straight, but its horizontal cross section has two concave sections (48 and 50) and a convex section (52). Horizontal ribs (30 and 32) are secured to the face of the baffle (20) and help it to maintain the desired cross-sectional shape.

8 Claims, 5 Drawing Figures

FLUID-STORAGE TANK

BACKGROUND OF THE INVENTION

The present invention is directed to tanks for storing fluids of various sorts. It is particularly applicable to tanks employed in tank trucks, but it is useful for other types of tanks also.

Fluid tanks of the type used on tank trucks typically include an elongated, somewhat tubular shell with internal baffles spaced longitudinally along the axis of the shell to support it. Conventional baffles (often called "heads" when they are fluid tight, particularly if they are disposed at the ends of the tank) come in many different shapes. One shape that is structurally beneficial is the dish-shaped baffle, which takes the form of a sphere segment. While such baffles have desirable structural characteristics, they tend to be expensive to fabricate.

It is less expensive to fabricate baffles having straight vertical cross sections and curved horizontal ones to contribute to vertical stiffness. One baffle of this type has a horizontal cross section shaped something like a flattened m; that is, it has two adjoining concave sections. Another has a sort of curved sawtooth shape in its horizontal cross section. While such baffles are less expensive to fabricate than are dish-shaped baffles, they lend themselves to fatigue and failure at the joints between the tank shell and the baffles.

It is accordingly an object of the present invention to achieve relatively low fabrication costs in a tank that has a low susceptibility to fatigue and failure at the joints between the baffle and the tank shell.

SUMMARY OF THE INVENTION

The foregoing and related objects are achieved in an elongated tank having a peripheral shell and at least one baffle that extends transversely of the longitudinal tank axis. The periphery of the baffle is joined to the interior surface of the shell. The baffle has a substantially straight vertical cross section but a curved horizontal cross section. In the horizontal cross section, the axial displacement as a function of transverse distance has a derivative that changes only gradually. Furthermore, it has at least one concave portion and one adjoining convex portion. Because the baffle has a straight vertical cross section and only a gradual curve in its horizontal cross section, it is relatively inexpensive to fabricate; it can be shaped from a flat blank with a conventional press break. In addition, the gradual curve causes load-induced stresses to be distributed uniformly and thus reduces the susceptibility to fatigue and failure of the joint between the shell and the baffle.

BRIEF DESCRIPTION OF THE DRAWINGS

These and further features and advantages of the present invention are described in connection with the accompanying drawings, in which.

DETAILED DESCRIPTION OF THE PREFERRED EMBODIMENT

Figure 1:
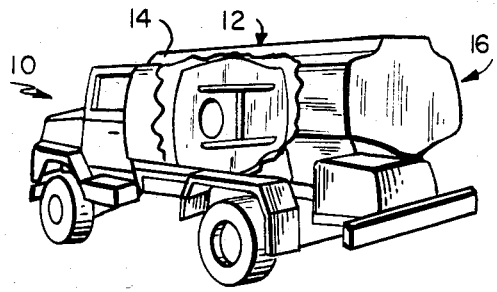
FIG. 1 is a perspective view of a tank of the present invention mounted on a truck chassis.

In FIG. 1, a truck 10 carries a tank 12 constructed in accordance with the teachings with the present invention. The forward portion 14 of the tank 12 is a liquid-containing portion that has a cross section in the shape of a modified rectangle with a curved top, bottom and sides. The rear portion 16 of the tank is a non-liquid-carrying portion provided for metering, hose storage, and other customer-determined purposes.

Figure 2:
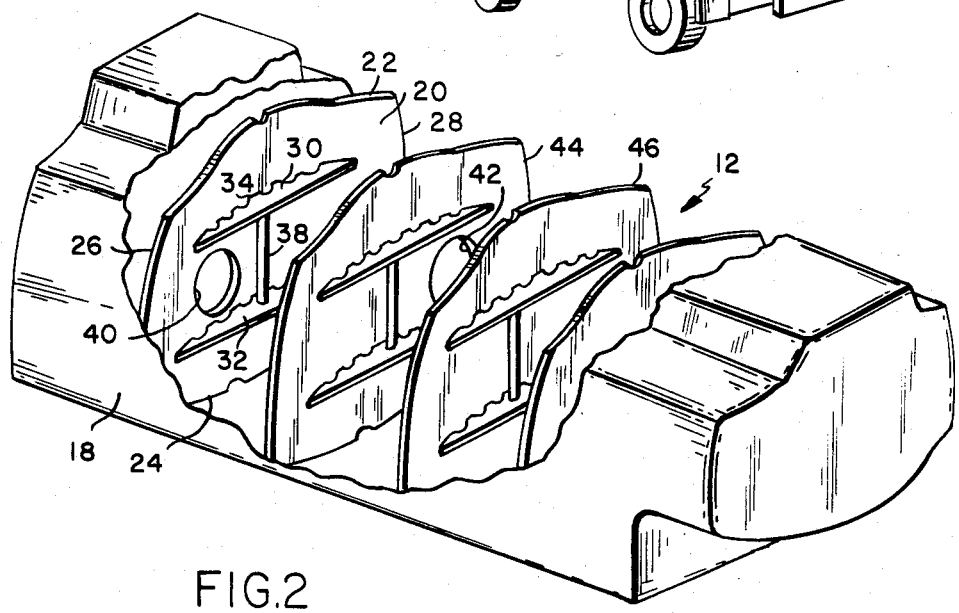
FIG. 2 is a perspective view, with parts broken away, showing the baffles in place inside the tank.

FIG. 2 shows that the shell 18 is internally supported by a number of baffles, such as baffle 20, extending transversely of the longitudinal axis of the tank 12. Baffle 20 is welded along its upper and lower edges 22 and 24 and side edges 26 and 28 to the shell 18. As FIG. 2 illustrates, these edges are curved in the shape that the shell 18 is intended to take.

Also provided on baffle 20 are a pair of transverse ribs 30 and 32, which have forward edges 34 and 36, respectively, welded to the face of the baffle 20 to assist it in maintaining its cross-sectional shape. Such ribs may not be needed in some embodiments of the present invention, but we prefer them in the design illustrated in the drawings. Another optional feature is a vertical stiffener 38. Although the curved horizontal cross section of the baffle 20 affords a high degree of vertical stiffness, vertical stiffener 38 may be desired in certain applications.

In the non-fluid-tight baffles illustrated in the drawings, openings such as opening 40 are provided to permit access to the different compartments in the tank. Opening 40 is offset from a similar opening 42 to avoid providing a direct axial path through the tank for liquid surges. In some embodiments of the present invention, the tank is compartmentalized to allow simultaneous storage of different types of fuel. In such cases, a fluid-tight baffle, or *head*, 46 segregates the two types of fluids and so does not have an access opening.

Figure 4:
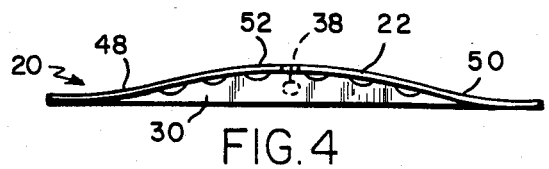
FIG. 4 is a plan view of the same baffle.
Figure 3:
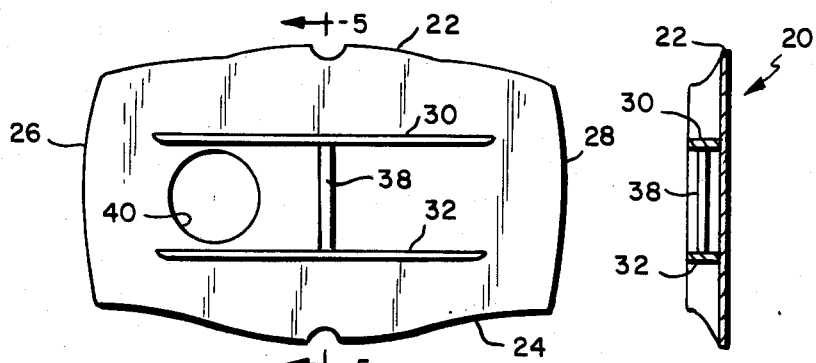
FIG. 3 is a front elevation of one of the baffles used in the tank of the present invention.
Figure 5:
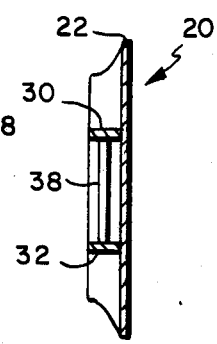
FIG. 5 is a side sectional view of the same baffle taken at line 5—5 of FIG. 3.

FIGS. 3, 4, and 5 show in more detail the curved cross-sectional shape of the baffle 20. FIG. 3 shows the peripheral curves of the top and bottom edges 22 and 24 and the side edges 26 and 28. FIG. 5 is a vertical cross section taken at line 5—5 of FIG. 3 and shows that the vertical cross section is straight, so the baffle panel can be fabricated with a conventional press-break machine. The curve given to the panel in its horizontal cross section is best seen in FIG. 4, which shows the panel as having two concave portions 48 and 50 at its ends and a convex portion 52 between them. The radii of curvature R1 and R2 of the concave portions and the radius of curvature R3 of the convex portion depend upon the panel material, the capacity of the tank, and its expected loading. For tanks used on over-the-road vehicles, R1, R2, and R3 are ordinarily between 45 inches (114 centimeters) and 125 inches (318 centimeters). Of course, within a given panel, the radius of curvature falls outside this range in the region in which the curve changes from concave to convex—i.e., the radius of curvature will go through infinity in one direction to infinity in the other direction—but the radius-of-curvature limits mentioned above obtain throughout most of the concave and convex regions 48, 50, and 52.

It is our belief that much of the fatigue and failure that occurs at the joints between the baffles and the shell in conventional fluid tanks results from concentrations of stresses at isolated points along the peripheries of the baffles. In the baffle illustrated in the drawings, however, the curve defined by the horizontal cross-section of the baffle is smooth; that is, the derivative of axial position with respect to transverse position changes only gradually. Our studies indicate that this results in a more uniform distribution of stresses, and we thus believe that a tank built with baffles of this type will enjoy greater longevity for a given material thickness than will tanks whose baffle designs have more-abrupt slope changes and discontinuities. Accordingly, the present invention represents a significant advance in the art.

We claim:

1. For containing fluid, a tank comprising:
   A. an elongated shell defining an interior chamber; and
   B. at least one baffle extending transversely of the longitudinal axis of the shell, the baffle having a substantially straight first cross section taken in a first direction normal to the longitudinal axis and having a second, curved cross section taken in a second direction normal to the longitudinal axis and the first direction, the second cross section having at least one concave portion and one adjoining convex portion and having a derivative of axial displacement with respect to distance in the second direction that changes only gradually with respect to distance in the second direction.

2. A tank as defined in claim 1 wherein the radii of curvature of the curved cross section within the convex and concave portions are between 45 inches and 125 inches.

3. A tank as defined in claim 2 further including a generally planar rib lying in a plane substantially parallel to the longitudinal axis of the tank and extending in the second direction, the rib having an edge secured to the baffle to assist it in retaining its shape.

4. A tank as defined in claim 1 wherein the curved cross section of the baffle includes a second concave portion adjoining the convex portion on the other side thereof from the first-mentioned concave portion.

5. A tank as defined in claim 4 wherein the radii of curvature of the curved cross section within the convex and concave portions are between 45 inches and 125 inches.

6. A tank as defined in claim 5 further including a generally planar rib lying in a plane substantially parallel to the longitudinal axis of the tank and extending in the second direction, the rib having an edge secured to the baffle to assist it in retaining its shape.

7. A tank as defined in claim 4 further including a generally planar rib lying in a plane substantially parallel to the longitudinal axis of the tank and extending in the second direction, the rib having an edge secured to the baffle to assist it in retaining its shape.

8. A tank as defined in claim 1 further including a generally planar rib lying in a plane substantially parallel to the longitudinal axis of the tank and extending in the second direction, the rib having an edge secured to the baffle to assist it in retaining its shape.

* * * * *